United States Patent
Buttjer et al.

(10) Patent No.: US 8,807,312 B2
(45) Date of Patent: Aug. 19, 2014

(54) HYDRAULIC ACTUATING PIN SYSTEM

(71) Applicant: Deere and Company, Moline, IL (US)

(72) Inventors: Jeffrey A. Buttjer, Cedar Falls, IA (US); Duane F. Meyer, Hudson, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 13/719,658

(22) Filed: Dec. 19, 2012

(65) Prior Publication Data

US 2014/0166425 A1    Jun. 19, 2014

(51) Int. Cl.
*F16D 67/04*    (2006.01)

(52) U.S. Cl.
USPC ............ 192/18 A; 192/12 C; 188/170

(58) Field of Classification Search
CPC ........................................ F16D 67/04
USPC ........................................ 192/18 A
See application file for complete search history.

(56) References Cited

U.S. PATENT DOCUMENTS

| | | | |
|---|---|---|---|
| 1,141,819 A * | 6/1915 | Moyer | 192/14 |
| 4,874,068 A * | 10/1989 | Collins et al. | 192/18 A |
| 5,437,355 A * | 8/1995 | Takagi et al. | 192/18 A |
| 6,250,433 B1 | 6/2001 | Sealine et al. | |
| 8,006,818 B2 * | 8/2011 | Vergara | 192/18 A |

FOREIGN PATENT DOCUMENTS

| | | |
|---|---|---|
| DE | 4127991 A1 | 2/1993 |
| DE | 69933118 T2 | 4/2007 |
| DE | 102006046712 A1 | 4/2008 |
| DE | 112011103541 T5 | 8/2013 |
| EP | 1342632 A1 | 9/2003 |

* cited by examiner

*Primary Examiner* — David D Le
*Assistant Examiner* — Mark Manley
(74) *Attorney, Agent, or Firm* — Taft Stettinius & Hollister LLP; Stephen F. Rost

(57) ABSTRACT

A hydraulic actuating pin system is disclosed with an actuating pin, clutch drum, spring and hydraulics. The clutch drum has a scalloped annulus with raised and lowered sections. The spring pushes the pin towards the scalloped annulus. When the pin extends into the lowered section, it prevents the clutch drum from rotating. The hydraulics can compress the spring and extract the pin to allow the clutch drum to rotate. The proximal end of the pin can include a head, and hydraulic pressure can move the head to compress the spring. When the pin is fully extended into the lowered section, the end of the pin can not touch the bottom of the lowered section. The hydraulics can include a one-way valve allowing flow from a pump source to the pin, and a pressure release orifice allowing controlled release of hydraulic pressure from the pin.

16 Claims, 5 Drawing Sheets

HYDRAULIC ACTUATING PIN SYSTEM

FIELD OF THE INVENTION

The present invention generally relates to the field of motorized machinery, and more specifically to a system and method for controlling rotation of a clutch drum during machine start-up.

BACKGROUND OF THE INVENTION

When coupling an implement to a machine where the implement is to be powered by an output shaft of the machine, it is desirable during startup to have the output shaft of the machine free to rotate about 60 degrees for coupling to the implement but not allow the output shaft to rotate more than 180 degrees from origin. It can be difficult to have the output shaft of the machine operate within these parameters under certain conditions. These parameters may vary for different machines and/or implements.

An exemplary condition where it is difficult for the machine engine powering the output shaft to operate within the above parameters is during cold start (for example, −30° C. or below). In some systems, a brake powered by a fluid pump is used to prevent the output shaft from rotating more than 180 degrees during start up. The fluid pump pulls fluid up a channel from a reservoir to engage the brake. During cold start conditions, the fluid can be very viscous and can take several seconds for the fluid pump to build brake pressure to pull the high viscous fluid up the channel and energize the brake system. So it may take several seconds for the brake volume to fill and apply any braking to the output shaft that has been running since start up.

One attempted solution to this problem is to have three pins equally spaced about the axis of the clutch center line. However, the output shaft can break these pins if the fluid pressure drops suddenly. Another disadvantage of this solution is that the piston and brake cone interface can be steel-on-steel which wears poorly and produces unwanted heat. An alternative design is to use steel piston and brake cone with roller balls instead of pins. In this alternative, the balls can wedge and create flat spots and produce a cyclic failure with the ball and ramp design. The common drawbacks with these attempted solutions to the "free" rotation and braking issues are: (1) whether it's a ball or pin, they will both fail with sudden loss of pressure; (2) steel-on-steel designs wear quickly; (3) the amount of braking pressure applied to the output shaft is only that of the Bellville springs utilized to push the piston back, and a high inertia implement can take minutes to spin down and risk snapping the pins if the steel-on-steel interface fails; and (4) the "free rotation" for coupling the implement is not actually free; in that there is constant pressure on the thrust bearing from the clutch Bellville springs.

It would be desirable to have a system that allows limited rotation of an engine output shaft to enable coupling of an implement to the output shaft while simultaneously preventing complete rotation of the output shaft. It would also be desirable to have such a system function in any conditions, including extreme cold, and to have such a system shutdown gracefully during a failure mode, such as a loss of hydraulic pressure.

SUMMARY

A hydraulic actuating pin system is disclosed that includes an actuating pin, a clutch drum, a spring and a hydraulic input. The actuating pin has a proximal end and a distal end. The clutch drum has a scalloped annulus extending circumferentially on a face of the clutch drum, the scalloped annulus having a raised section and a lowered section, the raised section extending away from the face of the clutch drum above the lowered section. The spring pushes the actuating pin towards the scalloped annulus of the clutch drum, and when the actuating pin extends into the lowered section of the scalloped annulus, the actuating pin prevents the clutch drum from rotating by preventing the raised section of the scalloped annulus from rotating below the actuating pin. The hydraulic input supplies hydraulic pressure to compress the spring and extract the actuating pin from the clutch drum and above the raised section of the scalloped annulus to allow the clutch drum to rotate without interference from the actuating pin.

The scalloped annulus of the clutch drum can include a plurality of raised sections separated by a plurality of lowered sections; each of the plurality of lowered sections can have substantially the same circumferential length, and each of the plurality of raised sections can have substantially the same circumferential length. The scalloped annulus can have three raised sections and three lowered sections.

The proximal end of the actuating pin can include a head, and the hydraulic pressure can move the head of the actuating pin to compress the spring and extract the actuating pin from the clutch drum. The spring can be coupled to the head of the actuating pin. The distal end of the actuating pin can include a distal face, and when the actuating pin is fully extended into the lowered section of the scalloped annulus of the clutch drum, the distal face of the actuating pin can not touch the bottom of the lowered section of the scalloped annulus of the clutch drum.

A hydraulic actuating pin system is disclosed that includes an actuating pin, a clutch drum, a spring and a hydraulic system controlling hydraulic pressure applied to compress the spring. The clutch drum has a scalloped annulus extending circumferentially on a face of the clutch drum, the scalloped annulus having a raised section and a lowered section, the raised section extending away from the face of the clutch drum above the lowered section. The spring pushes the actuating pin towards the scalloped annulus of the clutch drum, and when the actuating pin extends into the lowered section of the scalloped annulus, the actuating pin prevents the clutch drum from rotating by preventing the raised section of the scalloped annulus from rotating below the actuating pin. The hydraulic system controls hydraulic pressure causing the spring to compress and extracting the actuating pin from the clutch drum and above the raised section of the scalloped annulus to allow the clutch drum to rotate without interference from the actuating pin.

The hydraulic system can include a pump source controlling supply of hydraulic pressure, and a one-way flow valve between the pump source and the actuating pin. The one-way flow valve allows flow from the pump source to the actuating pin and blocks flow from the actuating pin to the pump source. The hydraulic system can also include a pressure release orifice in parallel with the one-way flow valve. The pressure release orifice allows controlled release of hydraulic pressure from the actuating pin. The hydraulic system can also include an accumulator hydraulically coupled to the actuating pin. The one-way flow valve allows flow from the pump source to the actuating pin and the accumulator and the pressure release orifice allows controlled release of hydraulic pressure from the actuating pin and the accumulator.

A hydraulic actuating pin system is disclosed that includes an actuating pin, a clutch drum, a spring and a hydraulic system. The clutch drum has a scalloped annulus extending circumferentially on a face of the clutch drum, the scalloped annulus having a plurality raised sections and a plurality of lowered sections, each of the plurality of raised sections extending away from the face of the clutch drum above the plurality of lowered sections. The spring pushes the actuating pin towards the scalloped annulus of the clutch drum, and when the actuating pin extends into a particular lowered section of the plurality of lowered sections of the scalloped annulus, the actuating pin prevents the clutch drum from rotating by preventing the adjacent raised sections of the plurality of raised sections of the scalloped annulus from rotating below the actuating pin. The hydraulic system controls hydraulic pressure applied to compress the spring, the hydraulic pressure causing the spring to compress and extracting the actuating pin from the clutch drum and above the plurality of raised sections of the scalloped annulus to allow the clutch drum to rotate without interference from the actuating pin.

DETAILED DESCRIPTION

Figure 1:
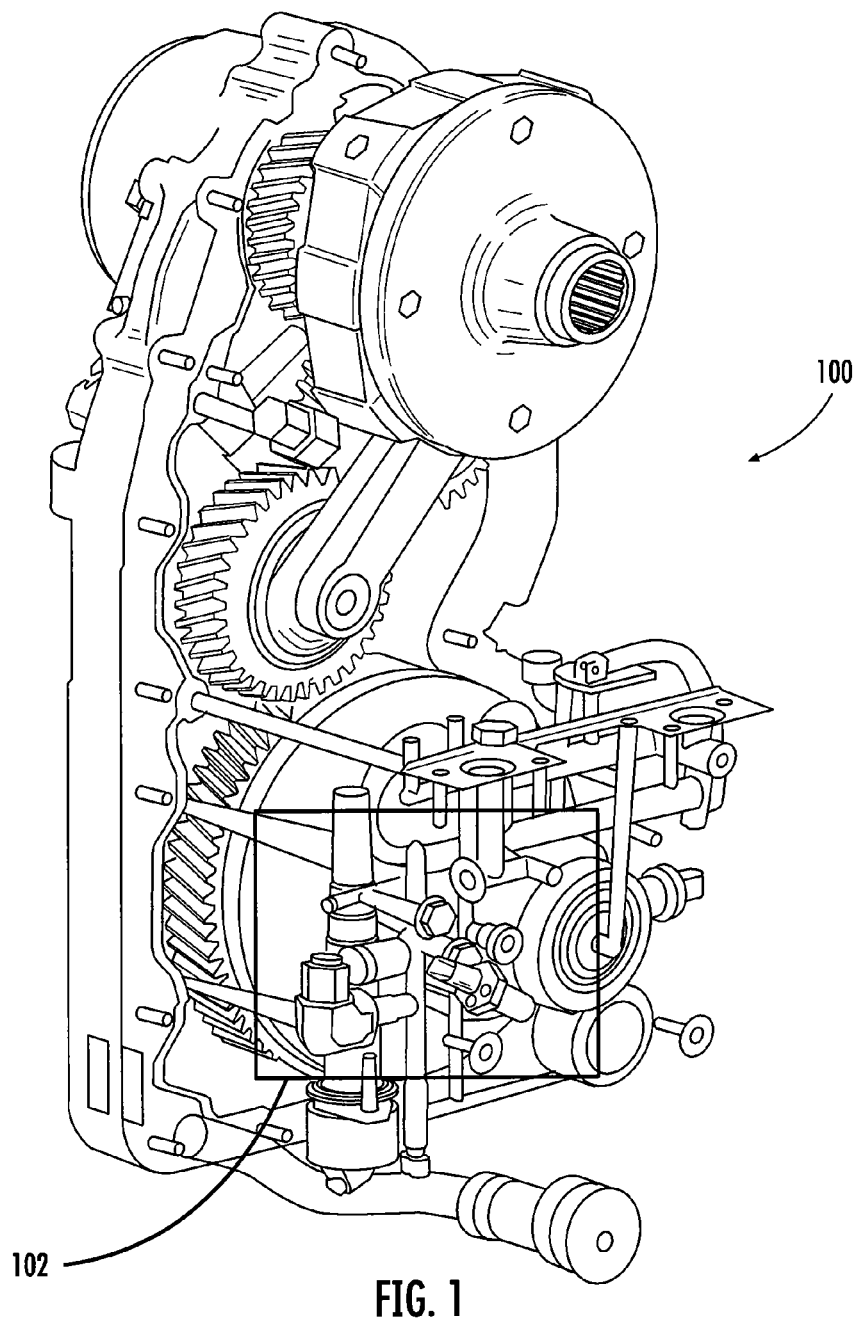
FIG. 1 shows an exemplary hydraulic actuating pin system coupled to the front end of a machine engine.

For the purposes of promoting an understanding of the principles of the novel invention, reference will now be made to the embodiments described herein and illustrated in the drawings and specific language will be used to describe the same. It will nevertheless be understood that no limitation of the scope of the novel invention is thereby intended, such alterations and further modifications in the illustrated devices and methods, and such further applications of the principles of the novel invention as illustrated therein being contemplated as would normally occur to one skilled in the art to which the novel invention relates.

Figure 2:
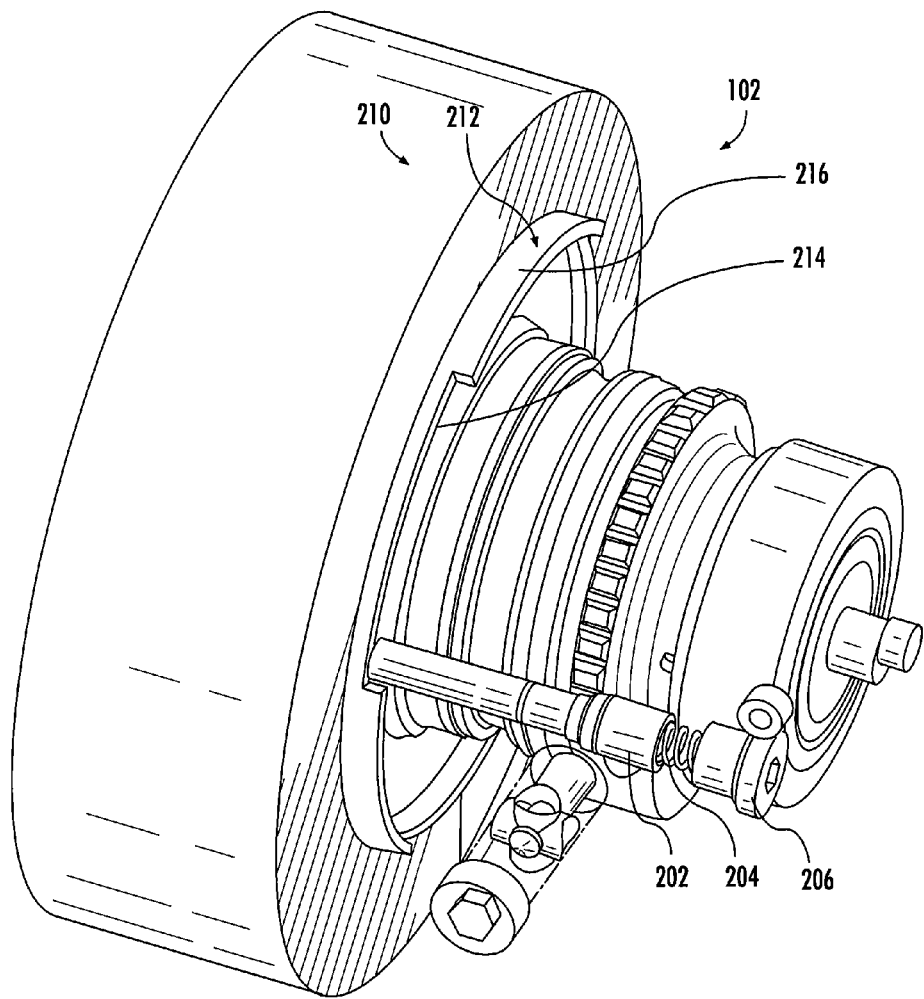
FIG. 2 shows a closer view of an exemplary hydraulic actuating pin system including the clutch drum.
Figure 4:
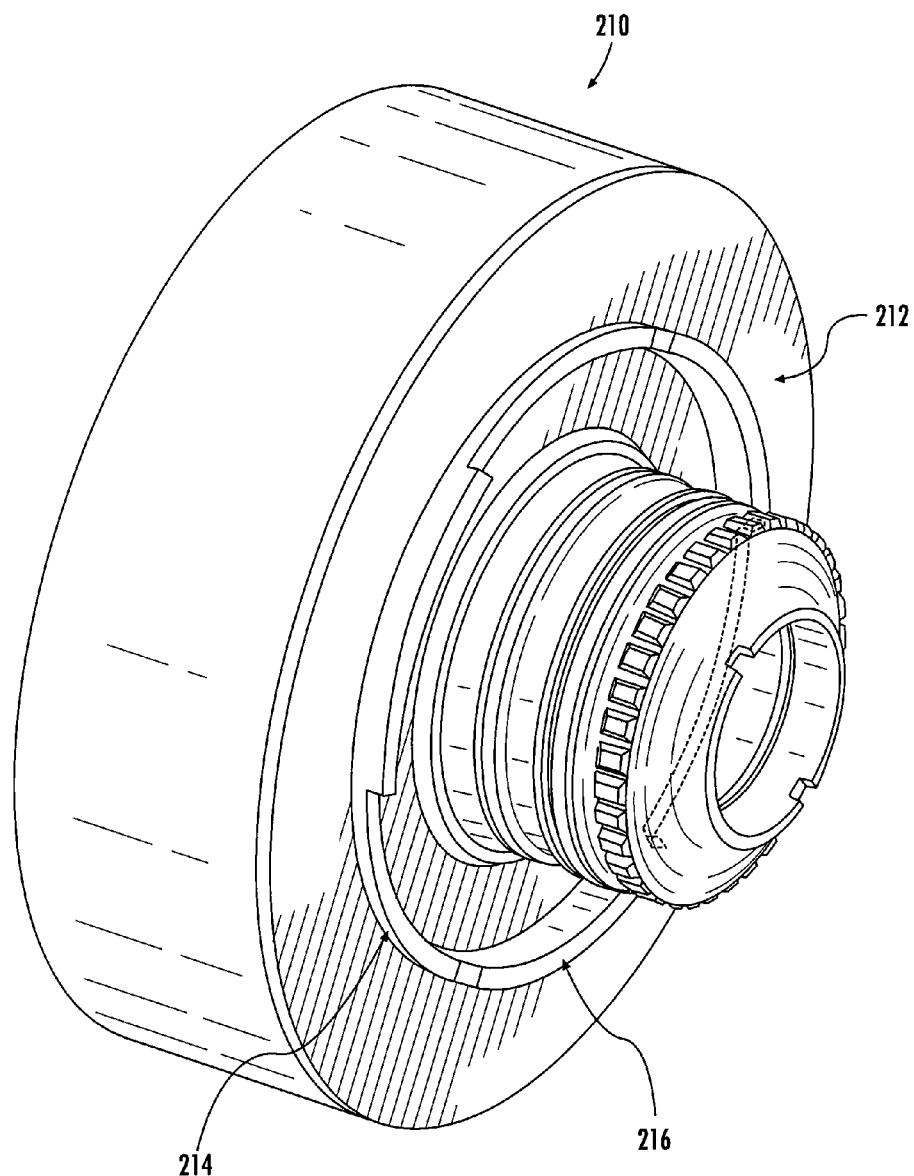
FIG. 4 shows an exemplary embodiment of a clutch drum for use with a hydraulic actuating pin system.

FIG. 1 shows an exemplary embodiment of a front end 100 of a machine engine with a hydraulic actuating pin system 102, and FIG. 2 shows a closer schematic of an exemplary embodiment of the hydraulic actuating pin system 102. The exemplary system 102 includes an actuating pin 202, a spring 204, a plug 206 and a clutch drum 210. FIG. 4 shows the exemplary clutch drum 210 by itself. The exemplary clutch drum 210 includes a scalloped annulus 212 with three lowered sections 214 extending circumferentially separated by three raised sections 216. The lowered sections 214 can be substantially even with the surface of the clutch drum 210 with the raised sections 216 extending above the surface of the clutch drum 210; or the lowered sections 214 can be below the surface of the clutch drum 210 with the raised sections 216 substantially even with the surface of the clutch drum 210; or the lowered sections 214 and the raised sections 216 can be above and/or below the surface of the clutch drum 210 with the lowered sections 214 being relatively lower than the raised sections 216. In the exemplary clutch drum 210 of FIGS. 2 and 4, the lowered sections 214 and the raised sections 216 are above the surface of the clutch drum 210 with the lowered sections 214 being relatively lower than the raised sections 216. In the embodiment of FIG. 4, the lowered sections 214 and the raised sections 216 have substantially equal circumferential lengths which allows the clutch drum to rotate approximately 60° when the actuating pin 102 extends inside one of the lowered sections 214, and to rotate up to 120° if the actuating pin 102 falls on one of the raised sections 216 and then rotates the length of the raised section before extending into an adjacent lowered section 214. The clutch drum 210 can include more or less raised and lowered sections 214, 216 depending on the desired distance of rotation when the actuating pin 202 is engaged/extended.

Figure 3:
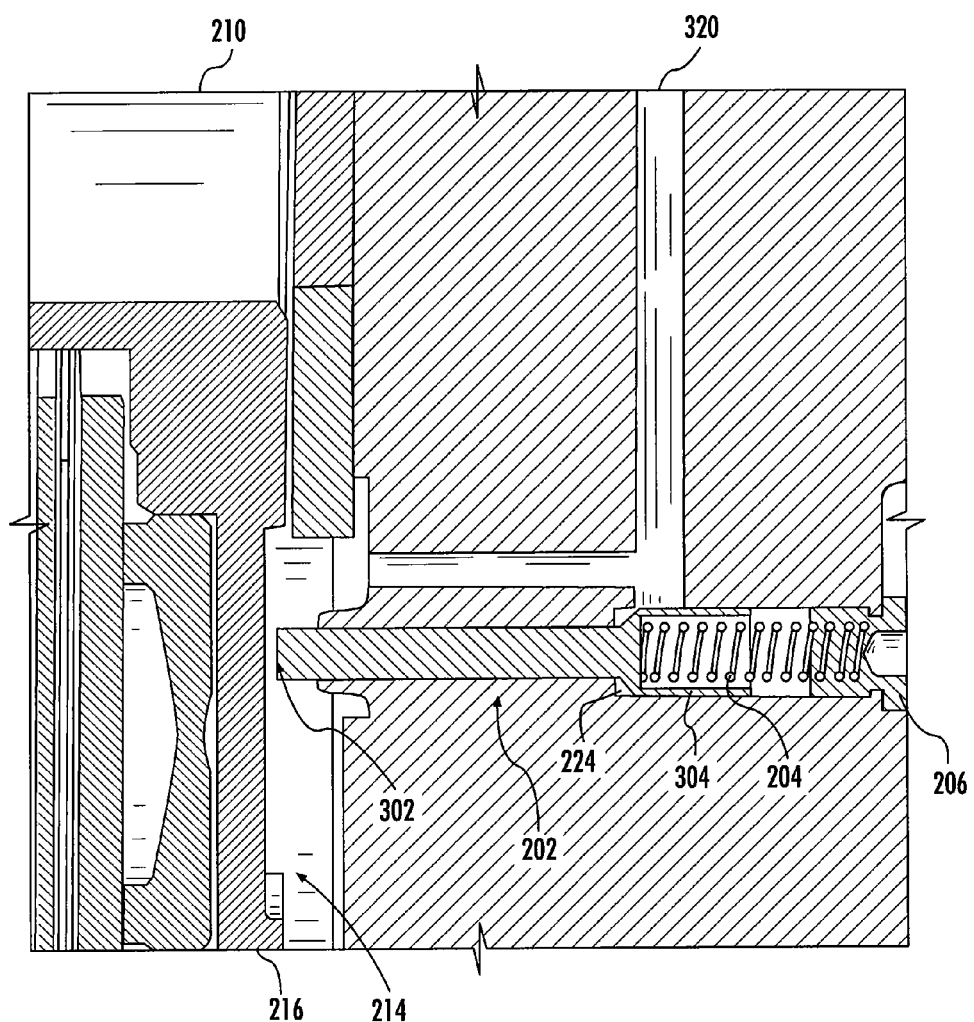
FIG. 3 shows a cross section of a portion of an exemplary hydraulic actuating pin system including the actuating pin and its extension into a lower region of the clutch drum.

FIG. 3 shows a cross-section of the actuating pin system 102 along with a system hydraulic line 320. The actuating pin 202 includes a distal face 302 and a proximal head 304 at the distal and proximal ends, respectively, of the actuating pin 202. The actuating pin 202 is positioned to extend towards and retract from the scalloped annulus 212 of the clutch drum 210.

The actuating pin 202 is controlled by a hydraulic system using the hydraulic line 320. When there is no hydraulic pressure, the spring 204 is uncompressed and pushes the actuating pin 202 towards the clutch drum 210, and when the actuating pin 202 extends into one of the lowered sections 214 it prevents the clutch drum 210 from moving beyond the ends of the lowered section 214 into which the actuating pin 202 is extended. The system can be configured so that when the actuating pin 202 extends into one of the lowered sections 214, the distal face 302 of the actuating pin 202 does not touch the clutch drum 210 in the lowered section 214. During operation, hydraulic pressure introduced through the hydraulic line 320 enters a retraction area 224 and pushes against the proximal head 304 of the actuating pin 202 to compress the spring 204 and move the actuating pin 202 away from the clutch drum 210, out of the lowered section 214 and above the raised sections 216 so that the clutch drum 210 can freely rotate.

Figure 5:
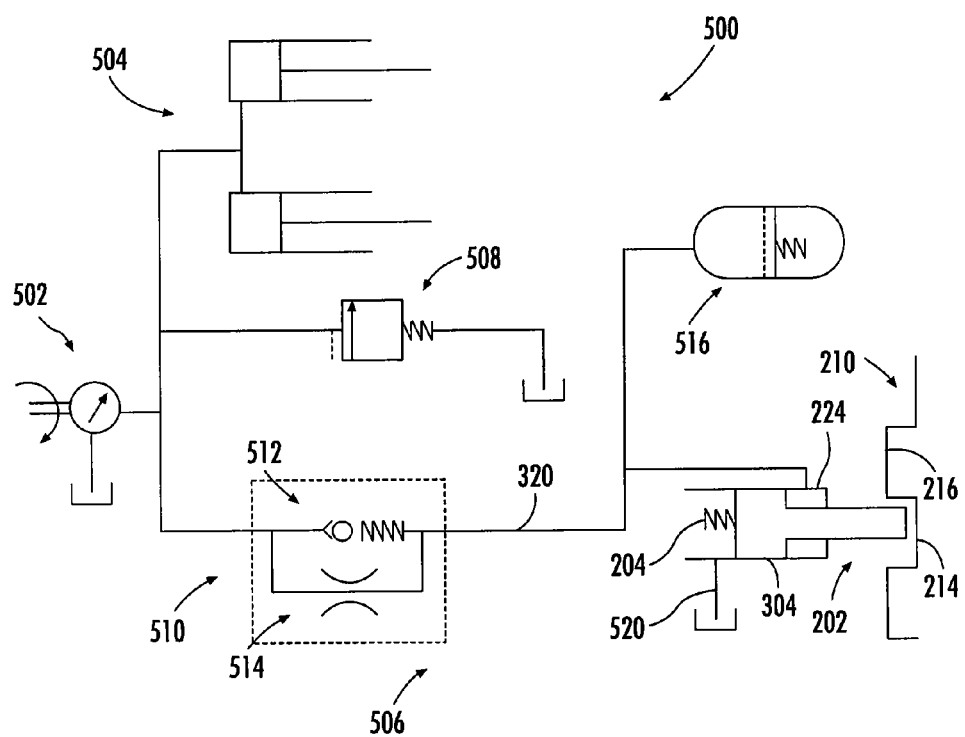
FIG. 5 shows a schematic of an exemplary hydraulic circuit for an exemplary hydraulic actuating pin system.

FIG. 5 shows a schematic of an exemplary embodiment of an actuating pin system and hydraulic circuit 500. The hydraulic circuit 500 includes a pump source 502 that provides hydraulic pressure to a brake system 504 and to an actuating pin system 506. The hydraulic system 500 can also include a system pressure regulating valve 508, and an accumulator 516. The actuating pin system 506 includes a pin valve body 510 with a one-way flow valve 512 and a pressure release orifice 514. When the hydraulic system 500 is not providing pressure, the spring 204 pushes the actuating pin 202 into one of the lowered sections 214 of the clutch drum 210 which only allows limited rotation of the clutch drum 210. When the hydraulic system is activated, the source 502 pumps fluid through the one-way valve 512 through the hydraulic line 320 and into the retraction area 224 below the proximal head 304 of the actuating pin 202. If the hydraulic system 500 also includes the accumulator 516, the source 502 of the activated hydraulic system 500 also pumps fluid through the one-way valve 512 through the hydraulic line 320 and into the accumulator 516. As hydraulic pressure increases in the retraction area 224, the proximal head 304 of the actuating pin 202 compresses the spring 204 and retracts the actuating pin 202 from the clutch drum 210 and above the raised sections 216 to allow free rotation of the clutch drum 210. The system pressure from the source 502 energizes the actuating pin 202, retracting the actuating pin 202 away from the face of the clutch plate 210 for free rotation of the clutch drum 210. FIG. 5 also shows a leakage path 520 back to sump if there is leakage of the hydraulic fluid around the head 304 of the actuating pin 202.

If system pressure is lost for some reason, the actuating pin 202 remains extracted from the clutch drum 210 and slowly returns towards the clutch drum 210 controlled by the pressure release orifice 514. If hydraulic pressure ceases, the hydraulic fluid in the retraction area 224 and the accumulator 516 (if included) will pass back through the hydraulic line 320 and bypass the one-way valve 512 through the pressure release orifice 514. This enables the spring 204 to uncompress and push the actuating pin 202 into one of the lowered regions 214 of the clutch drum 210. The pressure release orifice 514 and accumulator 516 can be sized to control the speed of reinsertion of the actuating pin 202 into the clutch drum 210.

The actuating pin 202 can be designed such that the distal face 306 does not contact the bottom of the lowered sections 214 of the clutch drum 210 when the actuating pin 202 is fully extended, thereby providing real free rotation of the clutch drum 210 within the bounds set by the lowered sections 214.

There can be more or less than three lowered sections and raised sections depending on the desired movement of the clutch drum 210 when the actuating pin 202 is extended. In addition, or alternatively, the circumferential lengths of the lowered sections and raised sections can be configured to control the movement of the clutch drum 210 when the actuating pin 202 is extended.

While exemplary embodiments incorporating the principles of the present invention have been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains.

We claim:

1. A hydraulic actuating pin system comprising:
an actuating pin having a proximal end and a distal end;
a clutch drum having a scalloped annulus extending circumferentially on a face of the clutch drum, the scalloped annulus having a raised section and a lowered section, the raised section extending away from the face of the clutch drum above the lowered section;
a spring pushing the actuating pin towards the scalloped annulus of the clutch drum, wherein when the actuating pin extends into the lowered section of the scalloped annulus, the actuating pin prevents the clutch drum from rotating by preventing the raised section of the scalloped annulus from rotating below the actuating pin; and
a hydraulic input supplying hydraulic pressure to compress the spring and extract the actuating pin from the clutch drum and above the raised section of the scalloped annulus to allow the clutch drum to rotate without interference from the actuating pin;
wherein the distal end of the actuating pin includes a distal face, and when the actuating pin is fully extended into the lowered section of the scalloped annulus of the clutch drum, the distal face of the actuating pin does not touch the bottom of the lowered section of the scalloped annulus of the clutch drum.

2. The hydraulic actuating pin system of claim 1, wherein the scalloped annulus of the clutch drum includes a plurality of raised sections separated by a plurality of lowered sections.

3. The hydraulic actuating pin system of claim 2, wherein each of the plurality of lowered sections of the scalloped annulus has substantially the same circumferential length.

4. The hydraulic actuating pin system of claim 3, wherein each of the plurality of raised sections of the scalloped annulus has substantially the same circumferential length.

5. The hydraulic actuating pin system of claim 4, wherein the scalloped annulus has three raised sections and three lowered sections.

6. The hydraulic actuating pin system of claim 1, wherein the proximal end of the actuating pin includes a head, and the hydraulic pressure moves the head of the actuating pin to compress the spring and extract the actuating pin from the clutch drum.

7. The hydraulic actuating pin system of claim 6, wherein the spring is coupled to the head of the actuating pin.

8. A hydraulic actuating pin system comprising:
an actuating pin having a proximal end and a distal end;
a clutch drum having a scalloped annulus extending circumferentially on a face of the clutch drum, the scalloped annulus having a raised section and a lowered section, the raised section extending away from the face of the clutch drum above the lowered section;
a spring pushing the actuating pin towards the scalloped annulus of the clutch drum, wherein when the actuating pin extends into the lowered section of the scalloped annulus, the actuating pin prevents the clutch drum from rotating by preventing the raised section of the scalloped annulus from rotating below the actuating pin; and
a hydraulic system controlling hydraulic pressure applied to compress the spring, the hydraulic pressure causing the spring to compress and extracting the actuating pin from the clutch drum and above the raised section of the scalloped annulus to allow the clutch drum to rotate without interference from the actuating pin;
wherein the distal end of the actuating pin includes a distal face, and when the actuating pin is fully extended into the lowered section of the scalloped annulus of the clutch drum, the distal face of the actuating pin does not touch the bottom of the lowered section of the scalloped annulus of the clutch drum.

9. The hydraulic actuating pin system of claim 8, wherein the hydraulic system comprises:
a pump source controlling supply of hydraulic pressure; and
a one-way flow valve between the pump source and the actuating pin, the one-way flow valve allowing flow from the pump source to the actuating pin and blocking flow from the actuating pin to the pump source.

10. The hydraulic actuating pin system of claim 9, wherein the hydraulic system further comprises a pressure release orifice in parallel with the one-way flow valve, the pressure release orifice allowing controlled release of hydraulic pressure from the actuating pin.

11. The hydraulic actuating pin system of claim 10, wherein the hydraulic system further comprises an accumulator hydraulically coupled to the actuating pin, the one-way flow valve allowing flow from the pump source to the actuating pin and the accumulator and the pressure release orifice allowing controlled release of hydraulic pressure from the actuating pin and the accumulator.

12. The hydraulic actuating pin system of claim 10, wherein the proximal end of the actuating pin includes a proximal head, and hydraulic pressure supplied to the actuating pin pushes against the proximal head of the actuating pin to compress the spring and extract the actuating pin from the clutch drum.

13. A hydraulic actuating pin system comprising:
an actuating pin having a proximal end and a distal end;
a clutch drum having a scalloped annulus extending circumferentially on a face of the clutch drum, the scalloped annulus having a plurality of raised sections and a plurality of lowered sections, each of the plurality of raised sections extending away from the face of the clutch drum above the plurality of lowered sections;

a spring pushing the actuating pin towards the scalloped annulus of the clutch drum, wherein when the actuating pin extends into a particular lowered section of the plurality of lowered sections of the scalloped annulus, the actuating pin prevents the clutch drum from rotating by preventing the adjacent raised sections of the plurality of raised sections of the scalloped annulus from rotating below the actuating pin; and a hydraulic system controlling hydraulic pressure applied to compress the spring, the hydraulic pressure causing the spring to compress and extracting the actuating pin from the clutch drum and above the plurality of raised sections of the scalloped annulus to allow the clutch drum to rotate without interference from the actuating pin;

wherein the distal end of the actuating pin includes a distal face, and when the actuating pin is full extended into a particular lowered section of the plurality of lowered sections of the scalloped annulus of the clutch drum, the distal face of the actuating pin does not touch the bottom of the particular lowered section of the scalloped annulus of the clutch drum.

14. The hydraulic actuating pin system of claim 13, wherein the hydraulic system comprises:

a pump source controlling supply of hydraulic pressure; and a one-way flow valve between the pump source and the actuating pin, the one-way flow valve allowing flow from the pump source to the actuating pin and blocking flow from the actuating pin to the pump source.

15. The hydraulic actuating pin system of claim 14, wherein the hydraulic system further comprises a pressure release orifice in parallel with the one-way flow valve, the pressure release orifice allowing controlled release of hydraulic pressure from the actuating pin.

16. The hydraulic actuating pin system of claim 15, wherein the proximal end of the actuating pin includes a proximal head, and hydraulic pressure supplied to the actuating pin pushes against the proximal head of the actuating pin to compress the spring and extract the actuating pin from the clutch drum.

* * * * *